US005158077A

United States Patent [19]

Sundström

[11] Patent Number: 5,158,077

[45] Date of Patent: * Oct. 27, 1992

[54] FILTER CONTAINER FOR AN ABSORPTION FILTER AND A PARTICLE FILTER, FOR DIRECT OR INDIRECT CONNNECTION TO A PROTECTIVE MASK

[75] Inventor: Per O. Sundström, Lidingö , Sweden

[73] Assignee: Sundström Safety AB, Lidingö , Sweden

[ * ] Notice: The portion of the term of this patent subsequent to Oct. 1, 2008 has been disclaimed.

[21] Appl. No.: 730,249

[22] Filed: Jul. 15, 1991

Related U.S. Application Data

[62] Division of Ser. No. 113,118, Oct. 27, 1987, Pat. No. 5,052,385.

[30] Foreign Application Priority Data

Oct. 30, 1986 [SE] Sweden ............................... 8604641

[51] Int. Cl.[5] ......................... A62B 7/10; B01D 46/10

[52] U.S. Cl. .......................... 128/205.27; 128/205.28; 128/205.29; 55/316; 55/DIG. 35; 55/521

[58] Field of Search ...................... 128/206.16, 206.17, 128/206.18, 206.19, 205.27, 205.28, 205.29, 206.12; 55/316, 497, 498, 499, 521, DIG. 33, DIG. 35

[56] References Cited

U.S. PATENT DOCUMENTS

| | | | |
|---|---|---|---|
| 2,825,424 | 3/1958 | Gross . | |
| 3,118,445 | 1/1964 | Norman | 128/206.17 |
| 4,543,112 | 9/1985 | Ackley et al. | 128/206.15 X |
| 4,548,626 | 10/1985 | Ackley et al. | 128/201.25 X |
| 4,714,486 | 12/1987 | Silverthorn | 128/206.17 X |
| 5,052,385 | 10/1991 | Sundstrom | 128/205.27 |

FOREIGN PATENT DOCUMENTS

| | | | |
|---|---|---|---|
| 2217761 | 10/1973 | Fed. Rep. of Germany | 128/205.29 |
| 3515642 | 10/1985 | Fed. Rep. of Germany . | |
| 845722 | 8/1939 | France . | |
| 1464075 | 12/1966 | France . | |
| 2121282 | 8/1972 | France . | |
| 164205 | 8/1964 | U.S.S.R. | 55/DIG. 33 |
| 1247524 | 9/1971 | United Kingdom . | |
| 396323 | 8/1983 | United Kingdom . | |

*Primary Examiner*—Paul E. Shapiro
*Assistant Examiner*—Sebastiano Passaniti
*Attorney, Agent, or Firm*—Shapiro and Shapiro

[57] ABSTRACT

A filter container for direct or indirect connection to a protective mask comprises a cup-shaped casing having a bottom wall with an inhalation air intake formed therein, a cover closing the casing and having a top wall with an inhalation air outtake formed therein, a particle filter disposed within a bottom portion of the casing and secured around its circumference to an inner sidewall of the casing, and an absorption filter mounted between the particle filter and the cover within an upper portion of the casing. The bottom wall of the casing has a plurality of inwardly projecting, circumferentially spaced, radially directed stiffening ribs formed thereon, and the stiffening ribs have inwardly facing longitudinal edges lying substantially in a single plane. The particle filter has upper and lower folds, and engages at lower folds thereof the inwardly facing longitudinal edges of the stiffening ribs and engages at upper folds thereof a member supporting a bottom of the absorption filter.

9 Claims, 3 Drawing Sheets

Fig.1
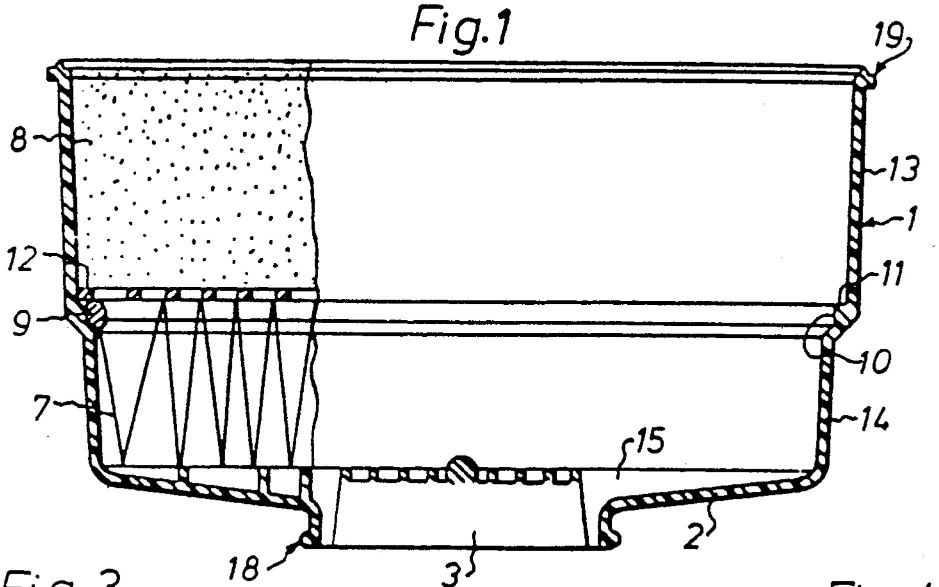
Fig.3
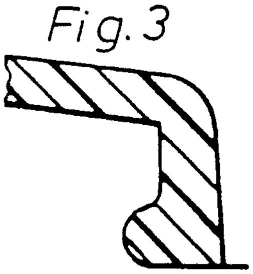
Fig.4
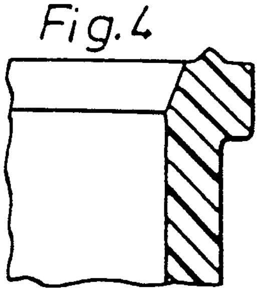
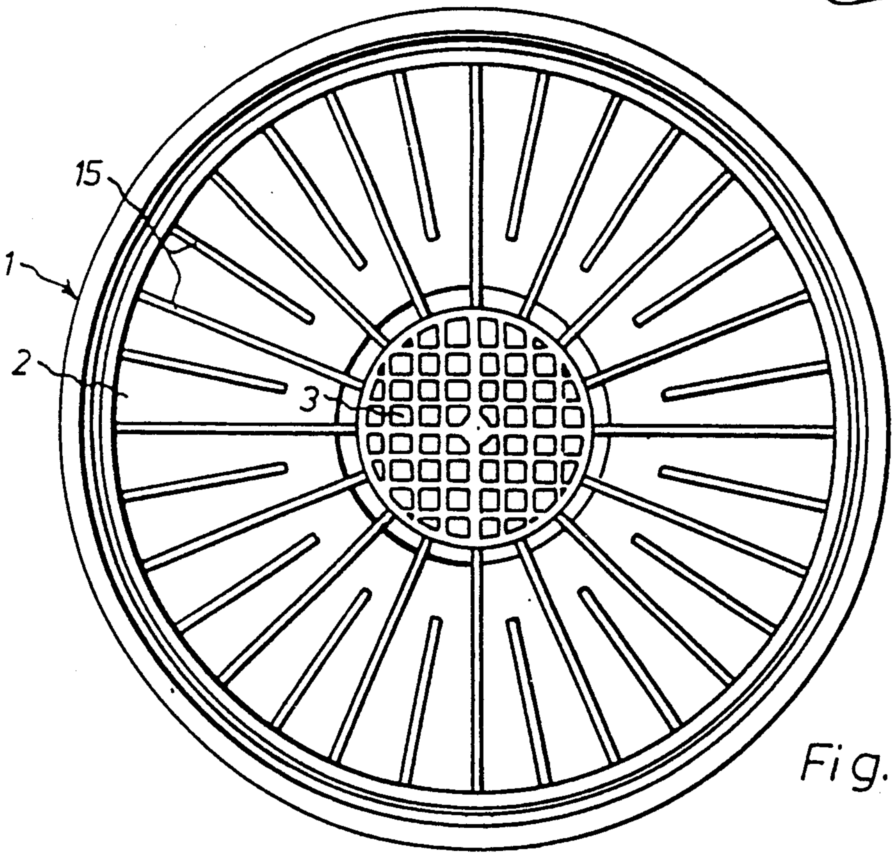
Fig.2

Fig. 9
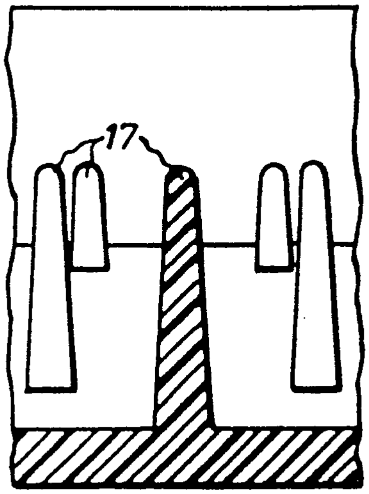
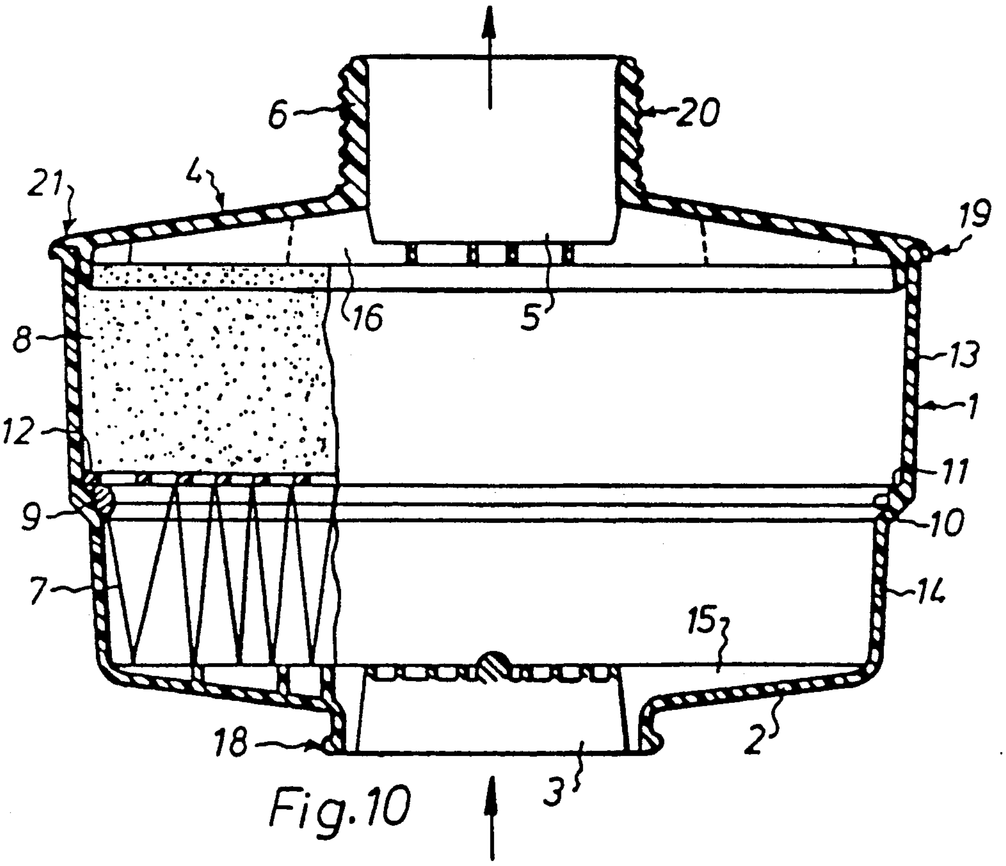
Fig. 10

FILTER CONTAINER FOR AN ABSORPTION FILTER AND A PARTICLE FILTER, FOR DIRECT OR INDIRECT CONNNECTION TO A PROTECTIVE MASK

CROSS-REFERENCE TO RELATED APPLICATION

This application is a division of application Ser. No. 113,118 filed Oct. 27, 1987 (allowed Apr. 18, 1991 now U.S. Pat. No. 5,052,385.

FIELD OF THE INVENTION

The present invention relates to a filter container for an absorption filter and a particle filter, said container being adapted to be directly or indirectly connected to a protective mask.

SUMMARY OF THE INVENTION

The filter container of the invention is preferably characterized in that it comprises a cup-shaped casing which has in its bottom an intake for inhalation air, and a cover closing said casing, said cover having an outtake for inhalation air and being connectible to the protective mask, said particle filter being arranged at the bottom of the cup-shaped casing, and said absorption filter being arranged between the particle filter and the cover closing the casing; that the particle filter is sealed to the casing by means of glue applied to the inner side of the casing; that the portion of the cup-shaped casing containing the particle filter is essentially cylindrical and has a diameter smaller than the remaining cylindrical casing portion containing the absorption filter; that the bottom of the casing and the cover are slightly conically bulging outwardly towards the air intake and the air outtake, respectively; and that closely lying, radially extending stiffening ribs are arranged on the slightly conical portions of the bottom and the cover, respectively, and have their tops facing inwardly towards the container lying in radial planes.

One of the advantages afforded by the present invention is that the tightness of the particle filter can be tested during production, before the casing is equipped with the absorption filter, whereby the production cost can be kept low.

BRIEF DESCRIPTION OF THE DRAWINGS

The invention will be described in more detail below, reference being had to the accompanying drawings which illustrate an embodiment, chosen by way of example, of the filter container according to the invention. In the drawings:

FIG. 1 is a vertical section of the casing, the left hand side showing the two filters;

FIG. 2 shows the casing as seen from above;

FIGS. 3 and 4 show parts of FIG. 1 on a larger scale;

FIG. 9 shows, on a larger scale, a section of FIG. 6 along the arrows indicated therein; and FIG. 10 shows the components according to FIGS. 1 and 5 in the assembled state, partly in section.

DETAILED DESCRIPTION OF THE INVENTION

Figure 5:
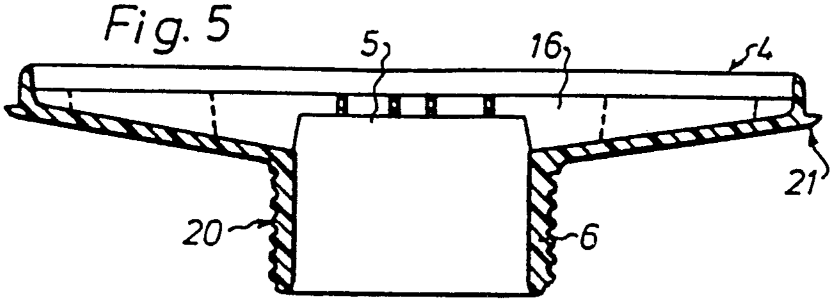
FIG. 5 is a vertical section of the cover.
Figure 7:
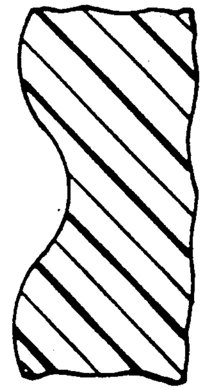
FIGS. 7 and 8 show parts of FIG. 5 on a larger scale.
Figure 8:
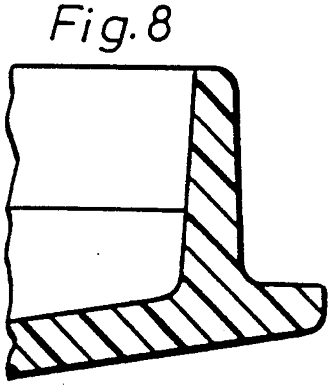

Referring now to the drawings, the filter container of the invention comprises, in preferred form, a cup-shaped casing 1, the bottom 2 of which is formed with an air intake 3, and a cover 4 closing the casing 1 and formed with an air outtake 5. The cover 4 is adapted to be directly or indirectly connected to a protective mask. To this end, the cover 4 either has a tubular, threaded central portion 6 for direct connection with the protective mask, or is formed such that it can be connected to the mask via an adapter.

As will appear from FIG. 1, a particle filter 7 is provided at the bottom 2 of the cup-shaped casing 1, an absorption filter 8 being mounted above the particle filter 7 in the casing. In the embodiment illustrated, the particle filter 7 consists of a folded paper-like material, while the absorption filter 8 may be a carbon filter preferably having thin textile filters (not shown) mounted on both sides thereof.

The particle filter 7 is tightly connected to the casing 1 by applying a glue 9 around the inner side of the casing. The glue 9 is applied to the upper edge of the particle filter 7, where the casing 1 has an annular recess 10 to accommodate the glue 9.

Figure 6:
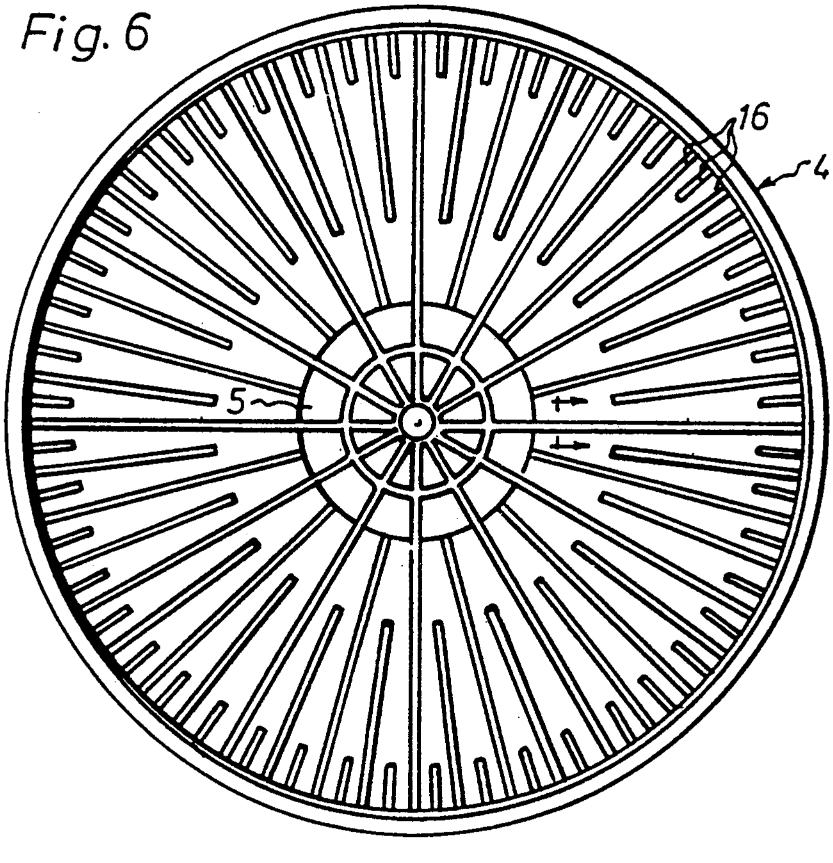
FIG. 6 shows the cover as seen from below.

About the air intake 3 in the bottom 2 of the casing 1 and about the air outtake 5 in the cover 4, large numbers of radially extending stiffening ribs 15, 16 are closely arranged at small acute angles (in the form shown, 32 ribs at angles of about 11° on bottom 2 and 96 ribs at angles of about 4° on cover 4). As will appear from the drawings, the bottom 2 of the casing 1 and the cover 4 are slightly conically bulging outwardly towards the air intake 3 and the air outtake 5, respectively, the tops 17 of each set of stiffening ribs 15, 16, which are facing inwardly toward the container, lying substantially in a single plane, as seen, for example, in FIG. 9. Preferably, as shown in FIGS. 2 and 6, ribs 15 and 16 are arranged with alternate longer and shorter radial lengths extending from points substantially uniformly distant from the filter container axis. Also, as shown in FIGS. 1 and 10, particle filter 7 may be positioned by engagement with a grid 12 (which supports the absorption filter 8) and longitudinal edges of ribs 15 at the top folds and bottom folds of the filter 7, respectively.

Above the annular recess 10, the casing 1 has an annular shoulder 11 against which the grid 12 is adapted to abut. The absorption filter 8 is adapted, in the closed condition of the casing 1, to urge the grid 12 into firm engagement with the annular shoulder 11. When the cover 4 has been applied to the casing 1, it thus compresses the powder material of the absorption filter 8, whereupon it is connected with the casing 1 by welding or the like.

The casing 1 and the cover 4 preferably are made from thermosetting plastic, the thickness of the plastic material being maintained essentially constant. This means that the casing part 13 containing the absorption filter 8 is wider than the casing part 14 containing the particle filter 7, because of the offset provided by the recess 10 and the shoulder 11. Since the cylindrical portion 14 thus has a diameter which is smaller than that of the portion 13, the assembled filter container will not to any appreciable degree block the field of vision of the person wearing the protective mask.

FIGS. 3, 4, 7, and 8, show, respectively, on a larger scale than in FIGS. 1 and 5, cross-sectional configurations of the lower rim region 18 of casing 1, the upper rim region 19 of casing 1, the threaded periphery 20 of the cover portion 6, and rim region 21 of the cover 4.

The invention is not restricted to the embodiment described above and illustrated in the drawings, but may be modified in various ways within the scope of the appended claims.

I claim:

1. A filter container for direct or indirect connection to a protective mask, comprising a cup-shaped casing having a bottom wall with an inhalation air intake formed therein, a cover closing said casing and having a top wall with an inhalation air outtake formed therein, a particle filter disposed within a bottom portion of said casing and secured around its circumference to an inner sidewall of said casing, and an absorption filter mounted between said particle filter and said cover within an upper portion of said casing, said bottom wall having a plurality of inwardly projecting, circumferentially spaced, radially directed stiffening ribs formed thereon, said stiffening ribs having inwardly facing longitudinal edges lying substantially in a single plane, and wherein said particle filter has upper and lower folds and said particle filter engages at lower folds thereof the inwardly facing longitudinal edges of said stiffening ribs and engages at upper folds thereof a member supporting a bottom of said absorption filter.

2. A filter container according to claim 1, wherein said particle filter is adhesively sealed around its circumference to said inner sidewall of said casing.

3. A filter container according to claim 2, wherein the upper portion of said casing has a circumferential shoulder on which said absorption filter is mounted and said lower portion of said casing has a circumferential recess adjacent to said circumferential shoulder and to which an upper circumferential edge of said particle filter is glued.

4. A filter container according to claim 3, wherein said member supporting said bottom of said absorption filter is urged firmly against said shoulder by said absorption filter.

5. A filter container according to claim 1, wherein said bottom wall bulges outwardly toward said inhalation air intake.

6. A filter container according to claim 1, wherein said bottom portion of said casing has a cylindrical sidewall and said upper portion of said casing has a cylindrical sidewall of slightly greater diameter than said sidewall of said bottom portion.

7. A filter container according to claim 1, wherein said cover is bonded to said casing and said inhalation air outtake has a threaded tubular extension for connection to the protective mask.

8. A filter container according to claim 1, wherein said ribs are arranged alternately in longer and shorter radial lengths.

9. A filter container according to claim 8, wherein said ribs have respective radial outer ends substantially uniformly distant from an axis of the filter container.

* * * * *